United States Patent
Oliveira et al.

(10) Patent No.: US 10,990,076 B2
(45) Date of Patent: Apr. 27, 2021

(54) AUTOMATIC EVAPOTRANSPIRATION MITIGATION

(71) Applicant: International Business Machines Corporation, Armonk, NY (US)

(72) Inventors: Igor Cerqueira Oliveira, São Paulo (BR); Ana Paula Appel, São Paulo (BR); Paula Fernanda Pereira, São Paulo (BR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 35 days.

(21) Appl. No.: 16/243,449

(22) Filed: Jan. 9, 2019

(65) Prior Publication Data

US 2020/0218227 A1 Jul. 9, 2020

(51) Int. Cl.
*A01G 25/16* (2006.01)
*G05B 19/406* (2006.01)
*G05B 19/4155* (2006.01)

(52) U.S. Cl.
CPC ....... *G05B 19/406* (2013.01); *G05B 19/4155* (2013.01); *G05B 2219/37509* (2013.01)

(58) Field of Classification Search
CPC .............. G05B 19/406; G05B 19/4155; G05B 2219/37509; A01G 9/242; A01G 25/167; A01G 9/24
See application file for complete search history.

(56) References Cited

U.S. PATENT DOCUMENTS

| 4,916,642 | A | * | 4/1990 | Kaiser | A01G 9/26 700/278 |
| 5,347,667 | A | * | 9/1994 | Schwarz | A45B 23/00 135/16 |
| 7,617,057 | B2 | | 11/2009 | May et al. | |
| 9,827,917 | B1 | * | 11/2017 | Jones | B60R 11/00 |
| 2002/0139403 | A1 | * | 10/2002 | Shi | A45B 11/00 135/16 |
| 2005/0039388 | A1 | * | 2/2005 | Wehner | A01G 9/16 47/17 |

(Continued)

FOREIGN PATENT DOCUMENTS

| CN | 201589773 U | 9/2010 |
| CN | 20198640 U | 9/2011 |
| CN | 102759609 A | 10/2012 |

(Continued)

OTHER PUBLICATIONS

Suarez-Romero, Armando. "Retractable roof greenhouse: Potential for Solanaceae production in semi-arid regions." (2006). (Year: 2006).*

(Continued)

*Primary Examiner* — Micheal D Masinick
(74) *Attorney, Agent, or Firm* — Joseph Petrokaitis, Esq.; McGinn IP Law Group, PLLC

(57) ABSTRACT

An evapotranspiration mitigation method, system, and computer program product include checking a condition via a first sensor connected to an outside of a device to compute an evapotranspiration level and activating a roof opening of the device to deploy a roof from the device if the evapotranspiration level is greater than a pre-determined threshold.

20 Claims, 9 Drawing Sheets

(56) References Cited

U.S. PATENT DOCUMENTS

2011/0167737 A1\* 7/2011 Wu .................. E04H 15/38
　　　　　　　　　　　　　　　　　　　　52/64
2019/0082802 A1\* 3/2019 Ma .................. A45B 25/14

FOREIGN PATENT DOCUMENTS

| CN | 202602714 U | \* | 12/2012 | |
|---|---|---|---|---|
| CN | 108738941 A | \* | 11/2018 | |
| EP | 3366114 A1 | \* | 8/2018 | ............. A01G 9/242 |

OTHER PUBLICATIONS

Mel, et al. "The NIST Definition of Cloud Computing". Recommendations of the National Institute of Standards and Technology. Nov. 16, 2015.

\* cited by examiner

FIG. 5
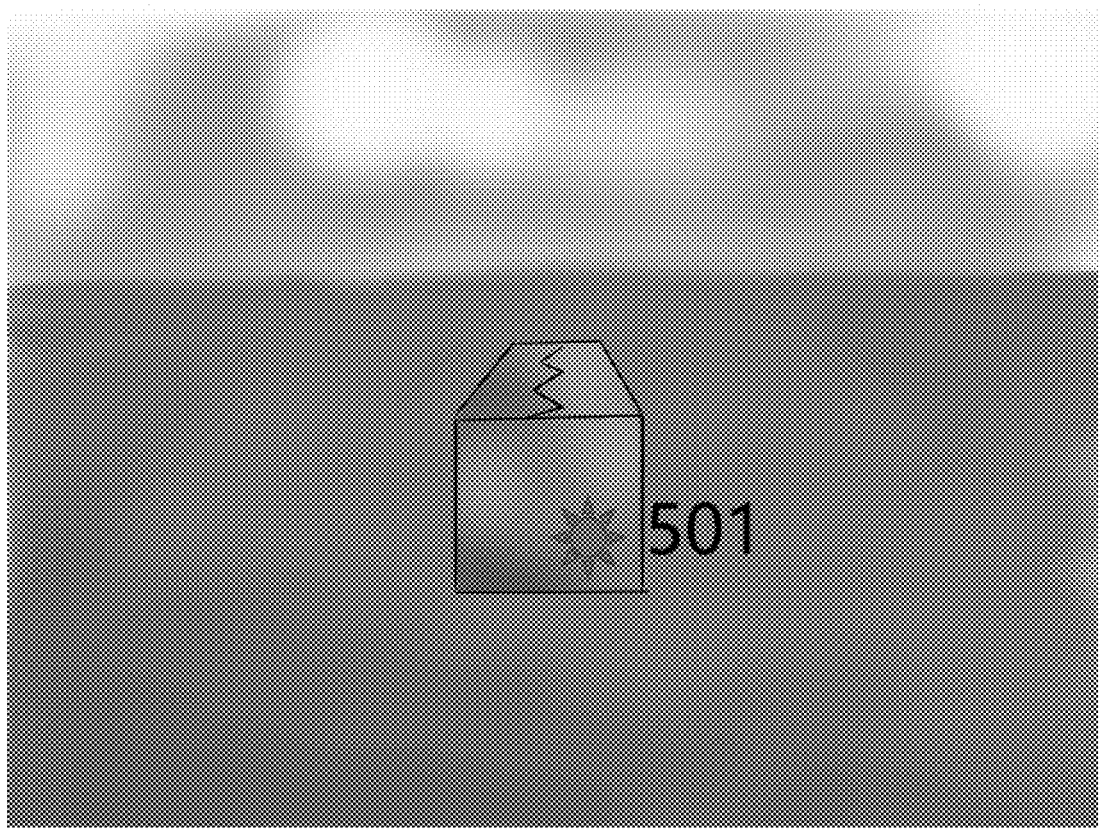
501  Sensors outside the enclosure / under roof

602 ✲ Sensors inside the enclosure / over roof

501 ✲ Sensors outside the enclosure / under roof

AUTOMATIC EVAPOTRANSPIRATION MITIGATION

BACKGROUND

The present invention relates generally to an evapotranspiration mitigation method, and more particularly, hut not by way of limitation, to a system, method, and computer program product for controlling an enclosure containing sensors for evapotranspiration computation (such as air temperature, relative humidity, wind speed, soil moisture, etc.) and a retractable mechanical surface (e.g., side or roof).

In agriculture operations, water and sunlight are the most essential input. On a daily basis, a significant amount of water is lost due to evapotranspiration from soil and plants. Evapotranspiration can be measured and modelled, given its dependency to atmospheric variables such as solar radiation, temperature, wind, etc. However, conventional techniques only consider water saving techniques without taking into account evapotranspiration.

SUMMARY

In view of the newly-identified problems in the art, the inventors have considered an improvement that includes a system that automatically detects periods of time when evapotranspiration is critical and launches a retracting surface (e.g., side or roof) that allows a portion of solar radiation pass. Once the evapotranspiration is detected to be below critical levels, the system retracts the protective surface (e.g., side or roof) and natural sunlight is re-established over the crop area.

In an exemplary embodiment, the present invention provides a computer-implemented evapotranspiration mitigation method, the method including checking a condition via a first sensor connected to an outside of a device to compute an evapotranspiration level and activating a surface opening of the device to deploy a surface (e.g., side or roof) from the device if the evapotranspiration level is greater than a pre-determined threshold. It is noted that while a surface including a roof is described below, the invention is equally applicable to a side of the surface being retractable depending upon the design configurations and constraints.

One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 5 exemplarily depicts the enclosed structure 302 in a crop field in an un-deployed state;

DETAILED DESCRIPTION

Figure 1:
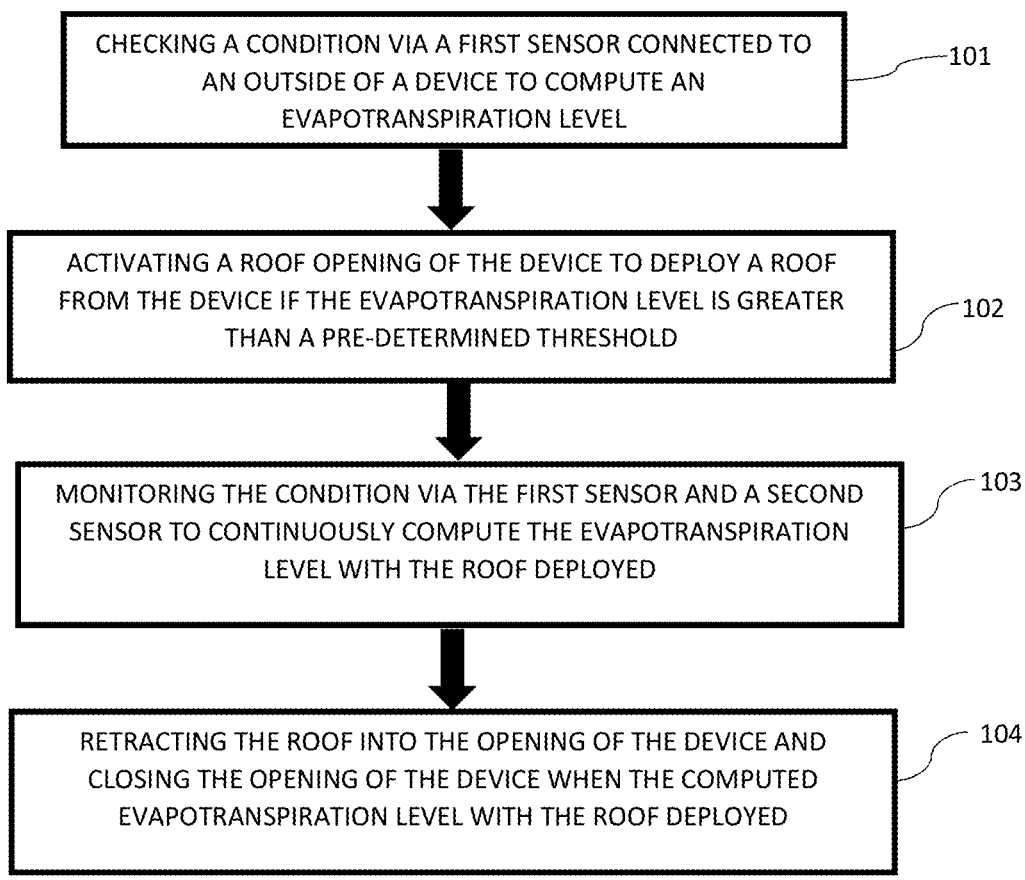
FIG. 1 exemplarily shows a high-level flow chart for an evapotranspiration mitigation method 100 according to an embodiment of the present invention.

The invention will now be described with reference to FIGS. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, an embodiment of an evapotranspiration mitigation method 100 according to the present invention can include various steps for proactively launching a roof over a crop(s) before a critical level of evapotranspiration is reached such that less water is lost to evapotranspiration for the crop(s).

Thus, while the inventive device is open, sunlight can reach the crop areas directly and evapotranspiration is significantly reduced.

Figure 7:
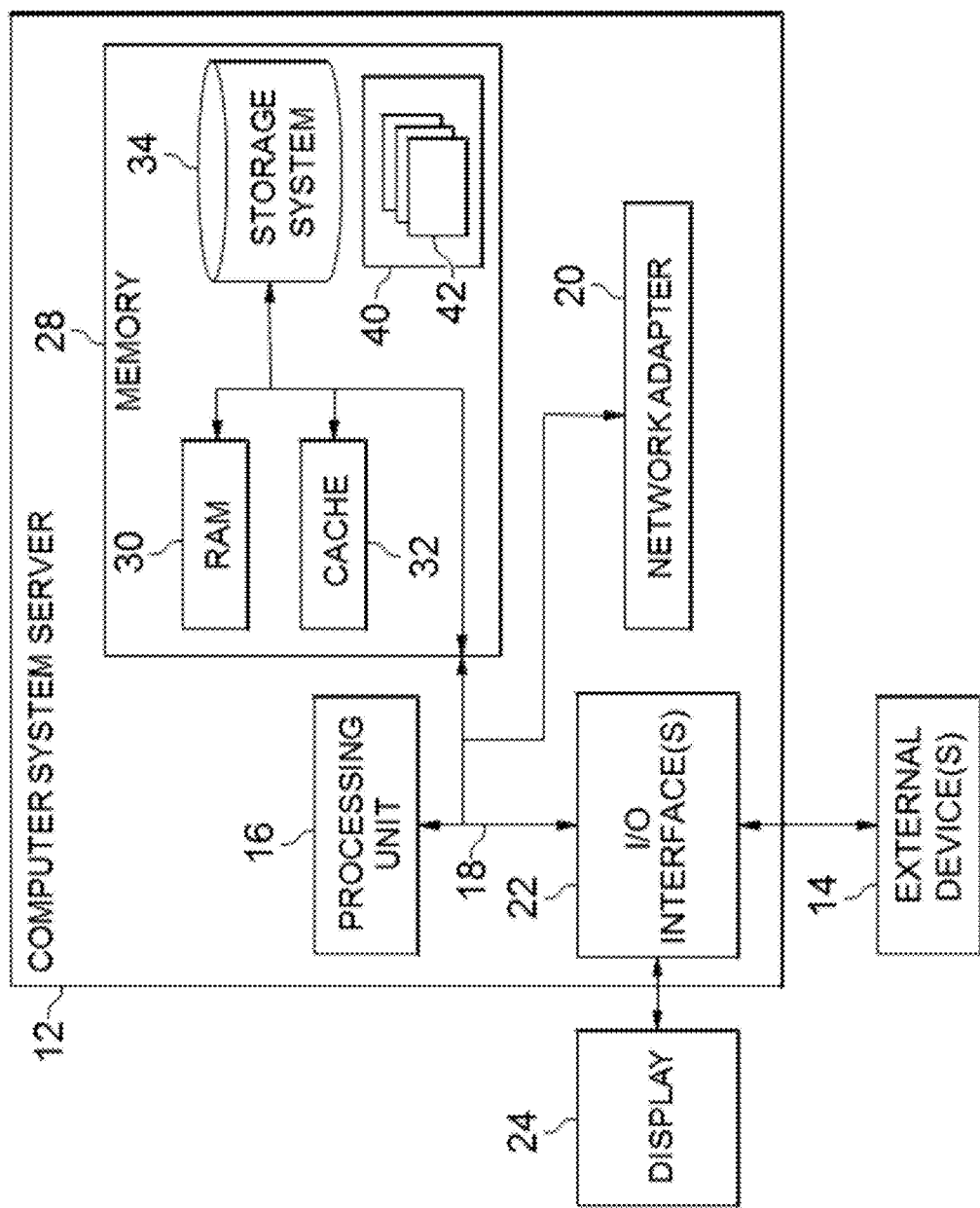
FIG. 7 depicts a cloud-computing node 10 according to an embodiment of the present invention.

By way of introduction of the example depicted in FIG. 7, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 9), it is nonetheless understood that the present invention can be implemented outside of the cloud environment.

Figure 2:
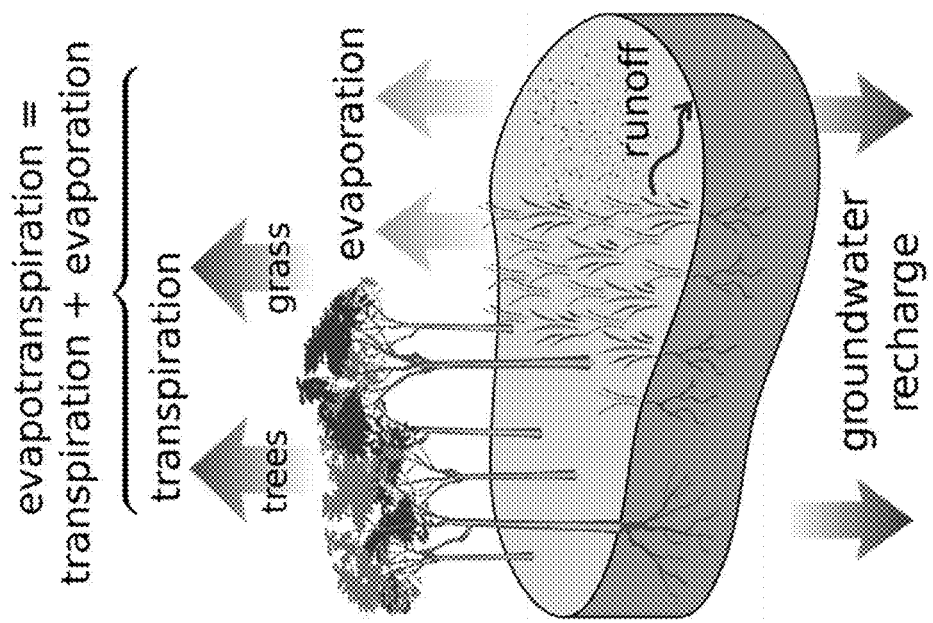
FIG. 2 exemplarily depicts variables that cause evapotranspiration.

It is noted that evapotranspiration is the combination of transpiration and evaporation as exemplarily depicted in FIG. 2.

Referring to FIGS. 3-6, the general structure of the apparatus 300 and control for evapotranspiration mitigation are described.

Figure 3:
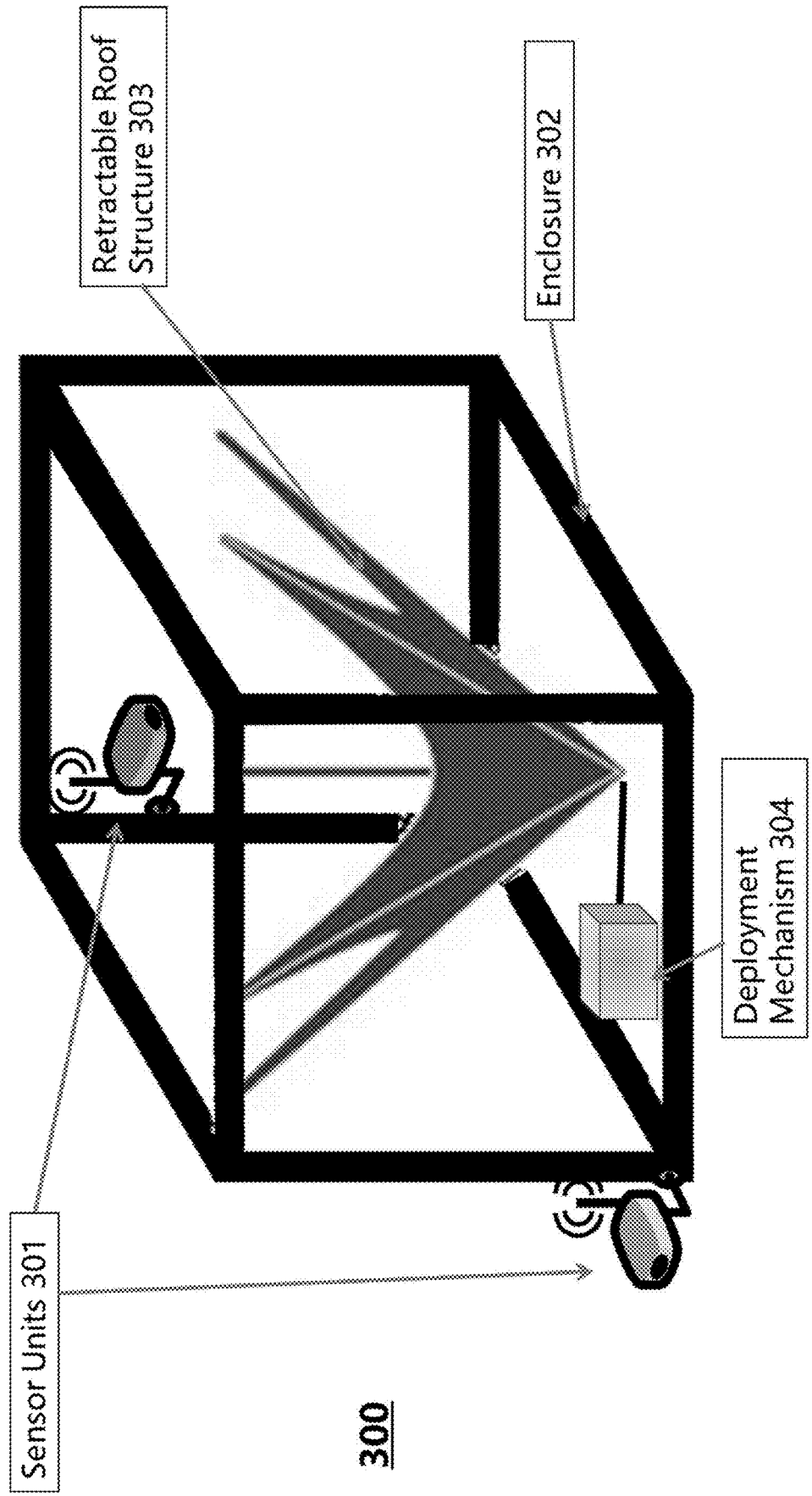
FIG. 3 exemplarily depicts an apparatus 300 for evapotranspiration mitigation.
Figure 4:
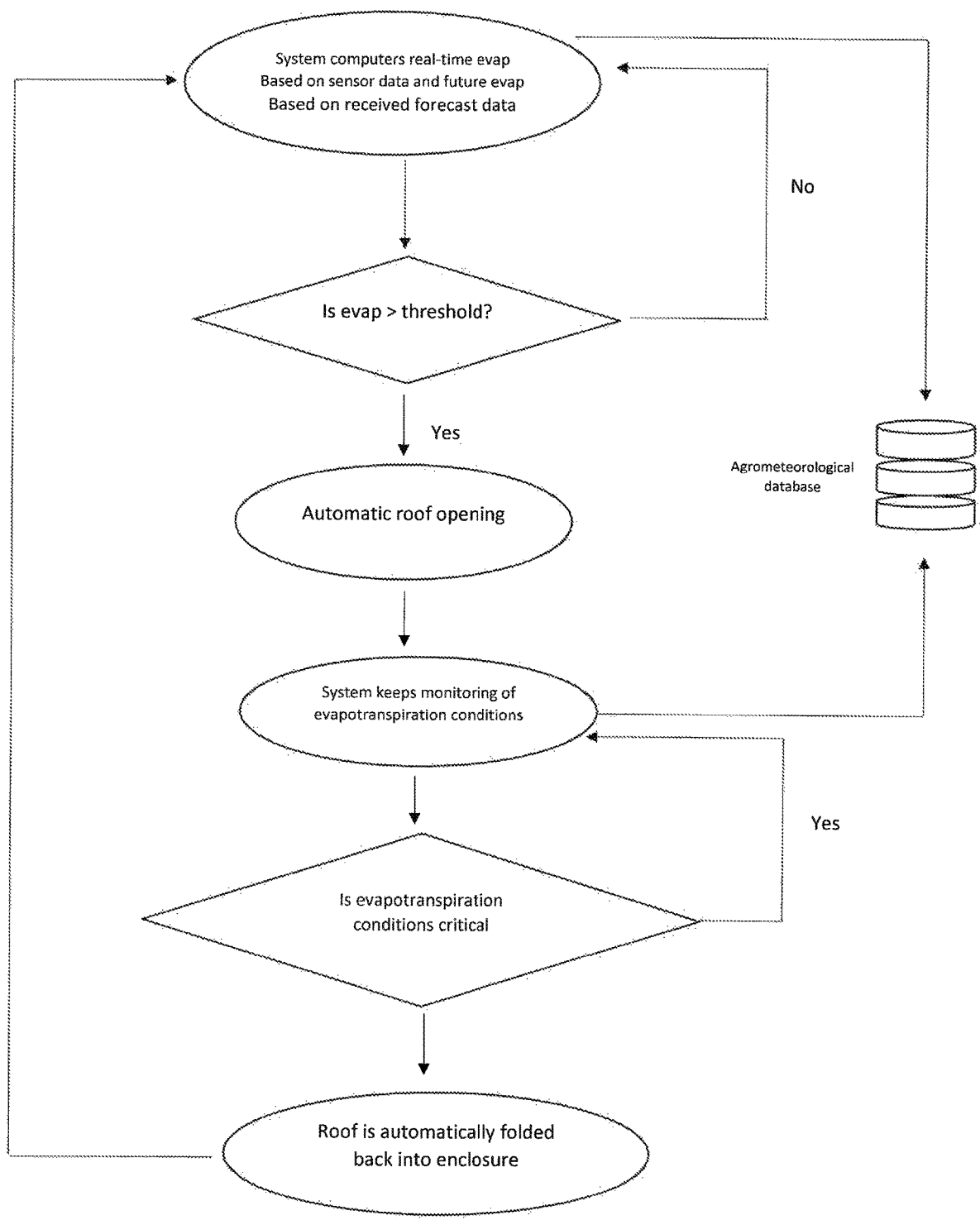
FIG. 4 exemplarily depicts a control flow for the apparatus 300.
Figure 6:
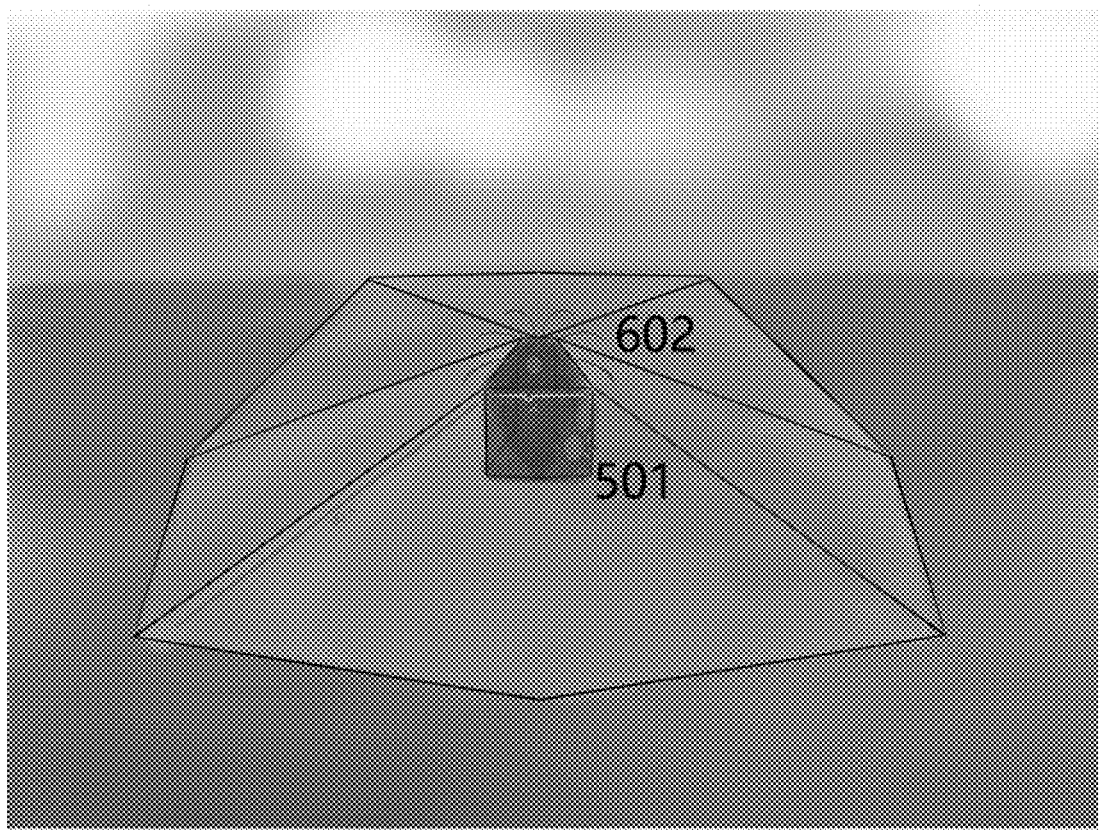
FIG. 6 exemplarily depicts the enclosed structure 302 with the roof structure 303 in a deployed state over crop.

As depicted in FIG. 3, the apparatus 300 includes an enclosed structure 302 having an openable/closable side (e.g., a roof in an exemplary embodiment) (e.g., zigzag line shown in FIG. 5). A roof structure 303 is folded to fit into the enclosed structure 302. The roof structure 303 is deployable and retractable to and from the enclosed structure 302 via the openable/closable roof (e.g., as shown in FIGS. 5 and 6). The enclosure 302 has different shapes and may be scalable in size such that an entire field or only a part of a field may be covered. Different crops may be covered also by scaling the size of the roof (e.g., corn requires a different structure than wheat).

A deployment mechanism 304 is disposed inside the enclosed structure 302 and is attached to the roof structure 303. Preferably, the deployment mechanism 304 is attached to the roof structure 303 at a center region of the roof structure 303. That is, when the roof 303 is deployed from the enclosed structure 302, the deployment mechanism 304 provides structural rigidity to the roof structure 303 (e.g., as in a column in a tent-like structure). Also, the deployment mechanism 304 stays attaches to the roof structure 303 such that the deployment mechanism 304 may use the attachment to retract the roof structure 303 back into the enclosed structure 302. Sensors 301 are provided outside of the enclosed structure 302 and inside the enclosed structure 302 but configured to be deployed outside of the roof structure 303 (e.g., so that readings can be taken under and above the roof 303).

A first sensor 501 as shown in FIG. 5 is connected to an outside of the enclosed structure 302 to compute an evapotranspiration level. The deployment mechanism 304 deploys the roof structure 303 through the operable/closable roof of the enclosed structure 302 such that the roof structure 303 covers a crop that surrounds an area near the enclosed structure 302 when the evapotranspiration level is greater than a pre-determined threshold.

As shown in FIG. 6, a second sensor 601 computes when the evapotranspiration level returns to being less than the pre-determined threshold and the deployment mechanism 304 retracts the roof structure 303 back through the openable/closable roof of the enclosed structure 302.

With reference to FIG. 6, a crop would be enclosed in an area surrounding the enclosed structure 302 and under the roof 303. Also, the edges of the roof 303 provide a seal to the soil. The roof 303 may be configured in such a way that straight sections are provided as shown in FIG. 6 so that the seal between the soil and the roof 303 is easier to obtain. Also, weights may be provided on the bottom of the structure to assist in sealing the enclosure 302.

The roof structure 303 comprises a translucent material or a semi-translucent material. That is, the roof 303 reduces the evapotranspiration but still allows sunlight to get to the crops covered by the roof 303.

In other words, FIGS. 3-6 depict an apparatus equipped with sensor units 301 (e.g., sensors and processor unit like a raspberry Pi) to automatically detect the periods where evapotranspiration is critical. Once the critical evapotranspiration threshold is detected (or forecasted), a retractable roof 303 is launched to cover the crop. The apparatus 300 can proactively launch the roof 303 before the critical levels are reached, if the forecasted data tells so. The roof 303 may be made of semi-transparent, semi-translucent, or a translucent material (or combination), thereby allowing the passing of enough sunlight for plant bio-activities. In 'under-the-roof' conditions, the sensor 601 of FIG. 6 keeps monitoring the meteorological variables. Once the critical threshold is no longer present, the roof is brought back to inside the enclosure Referring to FIGS. 1 and 4, in step 101, a condition is checked, via a first sensor connected to an outside of a device, to compute an evapotranspiration level.

In step 102, a roof opening of the device is activated to deploy a roof from the device if the evapotranspiration level is greater than a pre-determined threshold.

In step 103, the condition is monitored via the first sensor and a second sensor to continuously compute the evapotranspiration level with the roof deployed.

In step 104, the roof is retracted into the opening of the device and closing the opening of the device is closed when the computed evapotranspiration level with the roof deployed is less than the pre-determined threshold.

In one embodiment, the first sensor may be located outside of the device and under the roof when the roof is deployed. The second sensor may be located inside of the device before the roof is deployed such that the second sensor is located outside over the roof when the roof is deployed.

Step 102 deploys the roof via a deployment mechanism that is located inside the device and is attached to the roof.

The deployment mechanism stays attached to the roof when the roof is deployed such that the deployment mechanism retracts the roof back into the device. The deployment mechanism may be manually operated or electronically operated.

In one embodiment, the deployed roof is deployed such that edges of the roof seal to the soil and cover a crop. The deployed roof is deployed such that the roof covers a crop with a gap between a top of the crop and the roof. The deployed roof is deployed such that edges of the roof seal to the soil form a sealed enclosure around a crop.

In one embodiment, the conditions measured by the first sensor include temperature, solar radiation, precipitation, relative humidity, wind speed, wind direction, soil moisture, and soil temperature.

In one embodiment, the deployed roof includes a tent-like structure with the deployment mechanism structurally supporting a center area of the roof and the deployed roof includes straight-edged sections that seal the roof to the soil.

In another embodiment, the invention can include a computer program product, the computer program product including a computer-readable storage medium having program instructions embodied therewith, the program instructions executable by a computer to cause the computer to perform checking a condition via a first sensor connected to an outside of a device to compute an evapotranspiration level and activating a roof opening of the device to deploy a roof from the device if the evapotranspiration level is greater than a pre-determined threshold Exemplary Aspects, Using a Cloud Computing Environment Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction country, state, or datacenter).

Rapid elasticity; capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, sewers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity; and semantic interoperability. At the heart of cloud computing is an infrastructure comprising a network of interconnected nodes.

Referring now to FIG. 7, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 7, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 8:
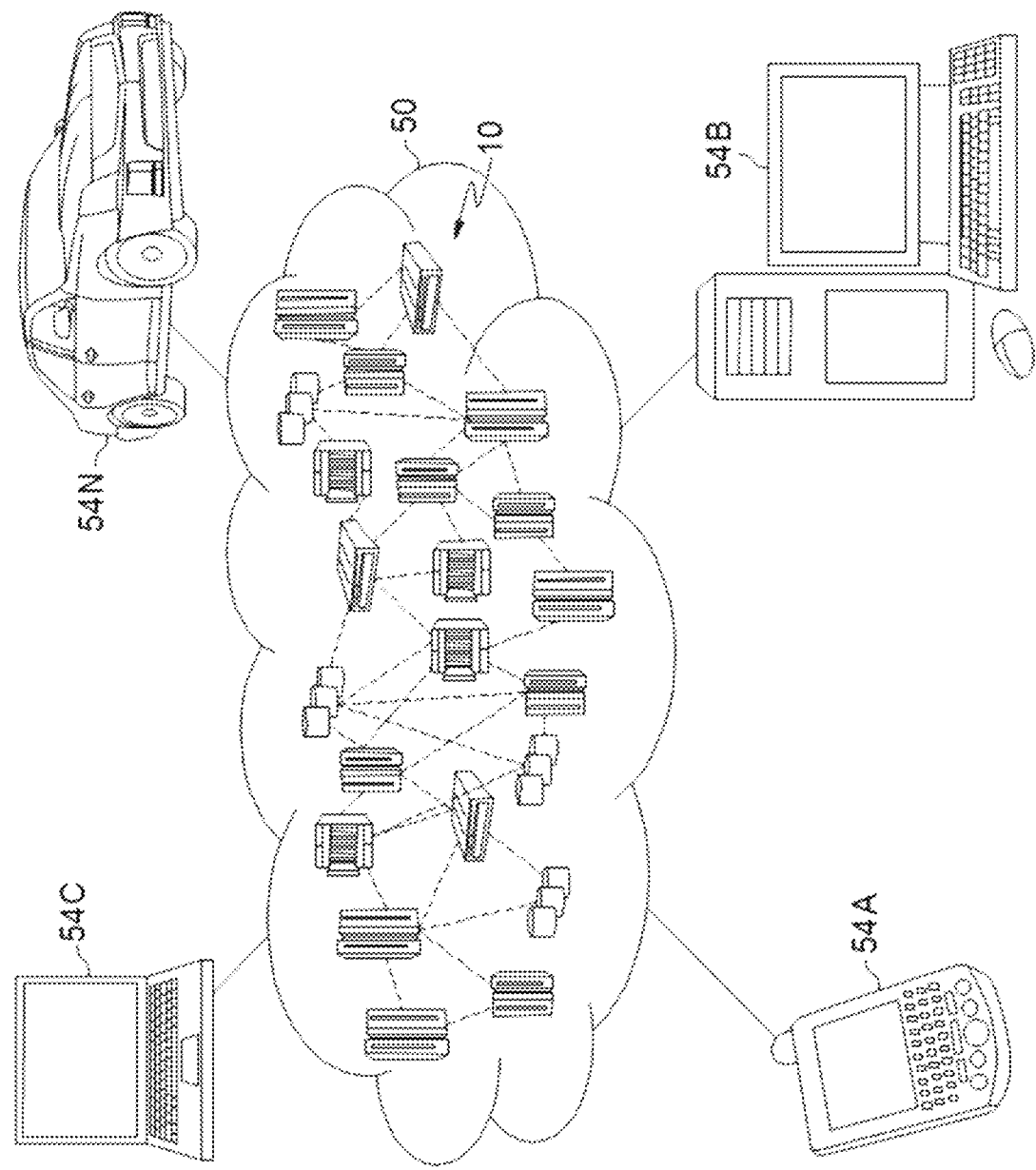
FIG. 8 depicts a cloud-computing environment 50 according to an embodiment of the present invention.

Referring now to FIG. 8, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Figure 9:
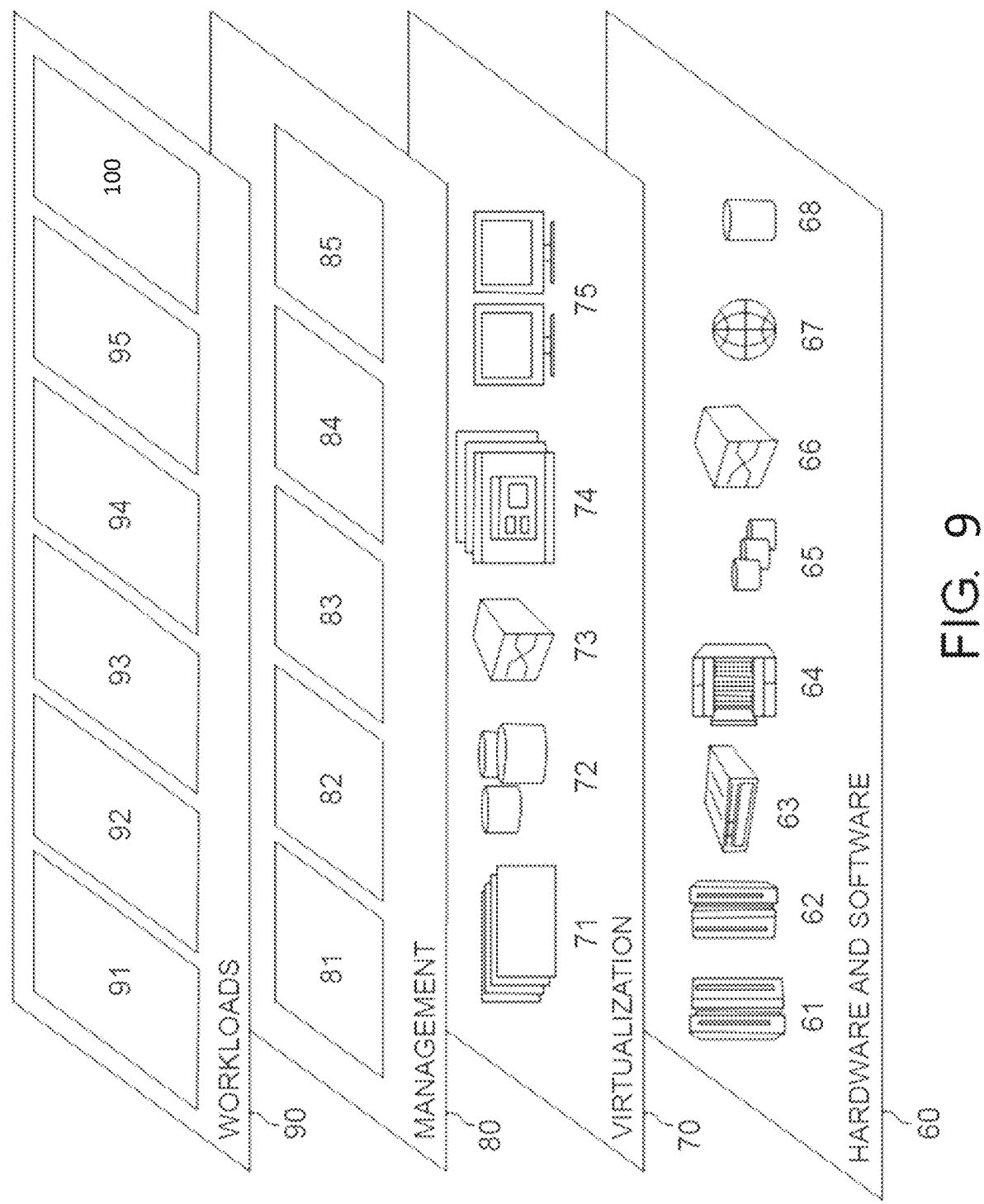
FIG. 9 depicts abstraction model layers according to an embodiment of the present invention.

Referring now to FIG. 9, an exemplary set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evapotranspiration mitigation method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware are instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry; in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of system, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but re not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented evapotranspiration mitigation method, the method comprising:
   checking a condition via a first sensor connected to an outside of a device to compute an evapotranspiration level; and activating a roof opening of the device to deploy a roof from the device if the evapotranspiration level is greater than a pre-determined threshold, wherein the device is installed at a soil level of a plurality of crops and is situated between the plurality of crops such that the roof deploys outward in relation a central location of the device, in each direction of 360° surround the location, from the device to cover the crops that surround the device, and wherein the roof covers an entirety of the device when deployed.

2. The computer-implemented method of claim 1, wherein the condition comprises an atmospheric condition, further comprising monitoring the atmospheric condition via the first sensor and a second sensor to continuously compute the evapotranspiration level with the roof deployed.

3. The computer-implemented method of claim 2, further comprising retracting the roof into the opening of the device and closing the opening of the device when the computed evapotranspiration level with the roof deployed is less than the pre-determined threshold.

4. The computer-implemented method of claim 1, wherein the first sensor is located outside of the device and under the roof when the roof is deployed.

5. The computer-implemented method of claim 1, wherein the activating deploys the roof via a deployment mechanism that is located inside the device and is attached to the roof.

6. The computer-implemented method of claim 3, wherein the activating deploys the roof via a deployment mechanism that is located inside the device and is attached to the roof.

7. The computer-implement method of claim 6, wherein the deployment mechanism stays attached to the roof when the roof is deployed such that the deployment mechanism retracts the roof back into the device.

8. The computer-implemented method of claim 2, wherein the first sensor is located outside of the device and under the roof when the roof is deployed, and wherein the second sensor is located inside of the device before the roof is deployed and such that the second sensor is located outside over the roof when the roof is deployed.

9. The computer-implemented method of claim 1, wherein the roof comprises a translucent material.

10. The computer-implemented method of claim 1, wherein the roof comprises a semi-translucent material.

11. The computer-implemented method of claim 1, wherein the deployed roof is deployed such that edges of the roof seal to a soil and cover the plurality of the crops.

12. The computer-implemented method of claim 1, wherein the deployed roof is deployed such that the roof covers the crop with a gap between a top of the plurality of the crops and the roof.

13. The computer-implemented method of claim 1, wherein the deployed roof is deployed such that edges of the roof seal to a soil to form a sealed enclosure around plurality of the crops.

14. The computer-implemented method of claim 1, wherein the condition comprises at least one of:
  temperature;
  solar radiation;
  precipitation;
  relative humidity;
  wind speed;
  wind direction;
  soil moisture; and
  soil temperature.

15. The computer-implemented method of claim 5, wherein the deployed roof includes a tent structure with the deployment mechanism structurally supporting a center area of the roof, and wherein the deployed roof includes straight-edged sections that seal the roof to a soil.

16. The computer-implemented method of claim 1, embodied in a cloud-computing environment.

17. An apparatus for evapotranspiration mitigation, the apparatus comprising:
  an enclosed structure having an openable/closable roof;
  a roof structure that is folded to fit into the enclosed structure, the roof structure being deployable and retractable to and from the enclosed structure via the openable/closable roof;
  a deployment mechanism disposed inside the enclosed structure and is attached to the roof structure; and
  a first sensor connected to an outside of the enclosed structure to compute an evapotranspiration level,
  wherein the deployment mechanism deploys the roof structure through the openable/closable roof of the enclosed structure such that the roof structure covers a crop that surrounds an area near the enclosed structure when the evapotranspiration level is greater than a pre-determined threshold, and
  wherein the device is installed at a soil level of a plurality of crops and is situated between the plurality of crops such that the roof deploys outward in relation a central location of the device, in each direction of 360° surround the central location, from the device to cover the crops that surround the device, and
  wherein the roof covers an entirety of the enclosed structure when deployed.

18. The apparatus of claim 17, wherein the deployment mechanism retracts the roof structure back through the openable/closable roof of the enclosed structure when the evapotranspiration level returns to being less than the pre-determined threshold.

19. An evapotranspiration mitigation system, the system comprising:
  a processor; and
  a memory, the memory storing instructions to cause the processor to perform:
    checking a condition via a first sensor connected to an outside of a device to compute an evapotranspiration level; and
    activating a roof opening of the device to deploy a roof from the device if the evapotranspiration level is greater than a pre-determined threshold,
  wherein the device is installed at a soil level of a plurality of crops and is situated between the plurality of crops such that the roof deploys outward in relation a central location of the device, in each direction of 360° surround the central location, from the device to cover the crops that surround the device, and
  wherein the roof covers an entirety of the device when deployed.

20. The system of claim 19, embodied in a cloud-computing environment.

* * * * *